United States Patent [19]

Leib

[11] Patent Number: 4,941,733

[45] Date of Patent: Jul. 17, 1990

[54] OPTICAL CORRELATOR SYSTEM

[75] Inventor: Kenneth G. Leib, Wantagh, N.Y.

[73] Assignee: Grumman Aerospace Corporation, Bethpage, N.Y.

[21] Appl. No.: 334,928

[22] Filed: Apr. 7, 1989

[51] Int. Cl.[5] .......................... G02B 27/46; G02B 5/32
[52] U.S. Cl. ............................... 350/162.13; 350/3.73; 350/3.77; 350/3.82; 350/162.12; 364/822; 382/31; 382/42
[58] Field of Search ...................... 350/3.68, 3.7, 3.73, 350/3.77, 3.82, 162.12, 162.13, 162.14; 364/822, 827; 382/31, 42

[56] References Cited

U.S. PATENT DOCUMENTS

| | | |
|---|---|---|
| 3,398,269 | 8/1968 | Williams . |
| 4,250,465 | 2/1981 | Leib . |
| 4,447,111 | 5/1984 | Leib . |
| 4,588,260 | 5/1986 | Horner . |

OTHER PUBLICATIONS

"Investigation of Large Capacity Optical Memories for Correlator Applications"–Kenneth G. Leib & Jay Mendelsohn (Technical Report) 1981.
"Color Image Recognition by Spectral-Spatial Matched Filtering"–F.T.S.YU, Optical Engineering, Nov.–Dec. 1984, vol. 23, No. 6, pp. 690–694.
"Baseline Test of a Matched Filter Correlator for Screening Aerial Reconnaissance Film"–Leib, Wohlers, Herold–May 1977 (Grummon Research Report).

Primary Examiner—Bruce Y. Arnold
Assistant Examiner—Jay Ryan
Attorney, Agent, or Firm—Scully, Scott, Murphy & Presser

[57] ABSTRACT

A polychromatic optical correlator system, comprising one or more devices to generate simultaneously a plurality of signal beams at a plurality of wavelengths, a beam recombiner to direct the signal beams along an axis to form a multicomponent, multiwavelength beam comprised of those signal beams, at least one view exposed to the signal beams to spatially modulate each of the signal beams, and a matched filter plate having a plurality of matched filters stored therein. A multiple beam generating holographic lens is located in the path of the multicomponent, multiwavelength beam to deflect each of the component signal beams thereof onto the matched filter plate, with each of the signal beams being focused on a respective one of the matched filters of the matched filter plate. Optical detection is located in the paths of output beams of the matched filter plate, to produce a signal when the correlation between the pattern of one of the signal beams focused on the matched filter plate and the matched filter on which that one beam is focused, rises above a predetermined value.

17 Claims, 3 Drawing Sheets

OPTICAL CORRELATOR SYSTEM

BACKGROUND OF THE INVENTION

This invention generally relates to optical correlator systems; and more specifically, to multiple channel optical correlator systems.

Optical correlator systems are used to detect the presence of a selected target in a scene or a field of view. In an optical correlator system, a coherent light beam is passed through a view or scene, which may include the selected target, and then transmitted through a matched filter plate. The matched filter plate contains a matched filter, which is a recording of a diffraction pattern, unique to the selected target; and if the selected target is present in the submitted view, the matched filter plate redirects a portion of the beam incident on it into a relatively intense output beam at a predetermined angle relative to the incident beam, and an inverse transform lens brings this output beam from the matched filter plate to a focus. However, if the selected target is not present in the submitted view, any output beam of the matched filter plate at this selected angle is relatively weak and diffused, and this output beam remains relatively diffused as it passes through the inverse transform lens. A light sensitive detector is located in the focal plane of the inverse transform lens; and when light of a sufficient intensity is focused on that detector, an output signal is produced. This output signal may be used to trigger some type of device, which depending on the apparatus in which the target recognition system is used, might be a simple alarm or a complex robotic guidance system, for example.

The capacity of an optical correlator system can be significantly increased by providing the system with a matched filter plate having a multitude of matched filters, and a multiple beam generating holographic lens that produces a matrix of output beams, and by focusing each of these output beams onto a respective one of the matched filters of the matched filter plate. Each of the matched filters employed in the system may be unique to a respective view of one target, or these matched filters may represent plural targets, and a correlator system having a multitude of such matched filters may be used, for example, to detect plural targets in a scene, or to detect one or more targets in a scene independent of the orientation of the target or targets in that scene.

A matched filter consists of a multitude of closely packed diffraction lines or patterns, which can be considered as covering a circular area of defined diameter, with the length of that diameter depending on the wavelength and the Fourier Transform focal length of the construction beam used to form the matched filter, the size of the object presented to that construction beam, and the percentage of maximum correlation that an operator wants to be able to obtain. Typically, these matched filters are arranged in a matched filter plate in a regular geometrical array. This arrangement, though, leaves a considerable amount of space on the matched filter plate unused, reducing the total number of matched filters that can be recorded on any given matched filter plate.

SUMMARY OF THE INVENTION

An object of the present invention is to provide an optical correlator system that may be effectively employed with a matched filter plate having a multitude of matched filters arranged therein in a regular or irregular pattern. Another object of this invention is to use one holographic lens to focus a plurality of signal beams having various wavelengths onto a single matched filter plate of an optical correlator system.

A further object of this invention is to focus a plurality of signal beams, each of which is uniquely spatially modulated, onto a single matched filter plate of an optical correlator system.

These and other objects are attained with a polychromatic optical correlator system, comprising means to generate simultaneously a plurality of electromagnetic signal beams at a plurality of wavelengths, means to direct the signal beams along an axis to form a multicomponent, multiwavelength beam comprising said signal beam, modulating image means to expose at least one view to the signal beams to spatially modulate each of the signal beams, and a matched filter plate having a plurality of matched filters stored therein. A multiple beam generating holographic lens is located in the path of the multicomponent, multiwavelength beam to deflect each of the component signal beams thereof onto the matched filter plate, with each of the signal beams being focused on a respective one of the matched filter of the matched filter plate, and optical detection means is located in the paths of output beams of the matched filter to produce a signal or signals when the correlation between the pattern of one of the signal beams focused on the matched filter plate and the matched filter on which said one of the beams is focused, rises above a predetermined value.

Further benefits and advantages of the invention will become apparent from a consideration of the following detailed description given with reference to the accompanying drawings which specify and show preferred embodiments of the invention.

DETAILED DESCRIPTION OF THE PREFERRED EMBODIMENTS

Figure 1:
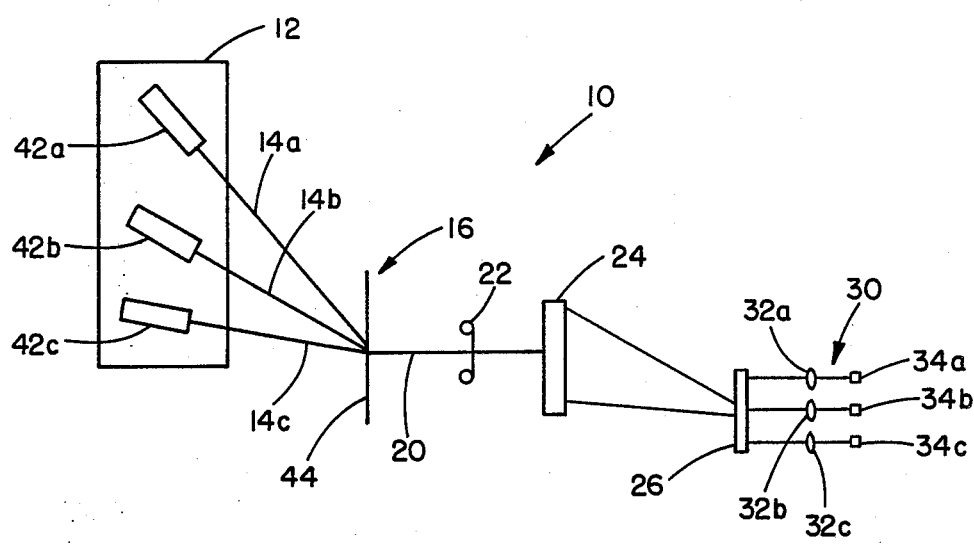
FIG. 1 is a schematic drawing of an optical correlator system according to the present invention.

FIG. 1 shows a polychromatic optical correlator system 10 in which beam generating means 12 produces a plurality of electromagnetic energy beams 14a, b, c, referred to as signal beams, and directs those beams to beam combining means 16, which directs the signal beams along or on an axis to form a multicomponent, multiwavelength beam 20 comprised of the individual signal beams. Each of the beams 14a, b, c has a substantially fixed wavelength that may be the same as or different than the wavelengths of the other signal beams; and, for example, beams 14a, b, c may have wavelengths of 4800 angstroms, 5300 angstroms and 6400 angstroms respectively.

Beam combining means 16 directs multicomponent beam 20 through beam modulating image means 22 and thence through multiple beam generating holographic lens 24. Image means 22 is used to expose each of the signal beams 14a, b, c to a scene or view suspected of having a selected target; and as the signal beams pass through the image means, each signal beam becomes amplitude modulated with the imagery on the selected scene. The film or picture exposed to the signal beams by image means 22 may be multi-colored, with each wavelength designating a particular object or class of objects, or that film or picture may be monochrome, in which case the monochromaticity is used for some overall, larger classification.

Figure 2:
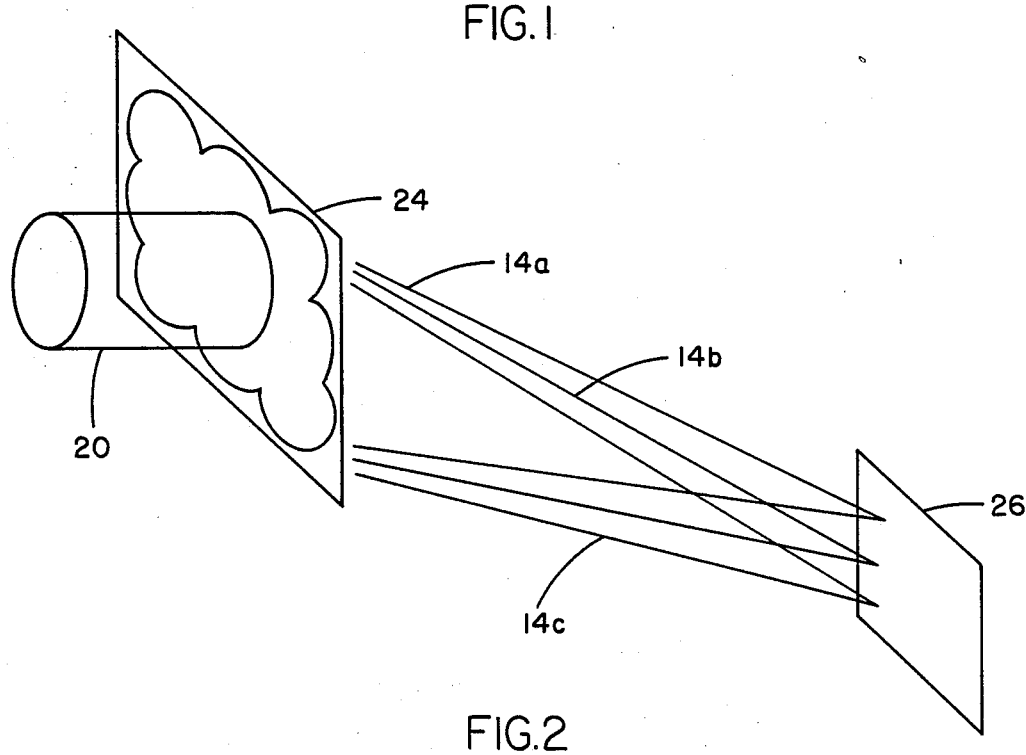
FIG. 2 is an enlarged view of a portion of FIG. 1, and in particular, schematically showing a portion of the output of the multiple beam generating lens thereof.
Figure 3:
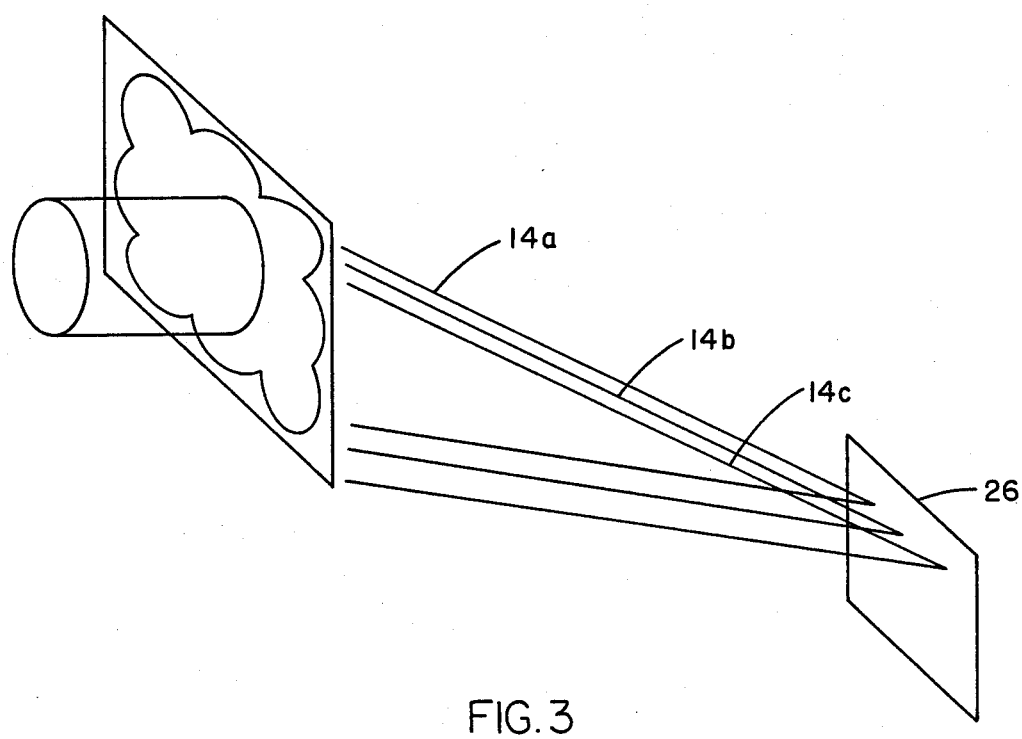
FIG. 3 illustrates a portion of the output of an alternate multiple beam generating lens that may be used in the system of FIG. 1.

Multiple beam generating holographic lens 24 is located in the path of the multicomponent, multiwavelength beam 20 to deflect each of the component signal beams thereof onto an optical memory element such as matched filter plate 26, either at the same angle or at different angles. More specifically, a holographic lens may be constructed so that, within limits, and relative to a selected plane, it will deflect a multitude of electro magnetic beams having various wavelengths at the same selected angle, or at different selected angles, while still focusing all of those beams on a common plane. For example, with reference to FIG. 2, lens 24 may be used to focus signal beam 14a, which has a wavelength of 4800 angstroms, at an angle of 12.0° and a focal distance of 400 mm; to focus signal beam 14b which has a wavelength of 5300 angstroms at an angle of 12.5 ° and a focal distance of 400 mm; and to focus signal beam 14c, having a wavelength of 6400 angstroms, at an angle of 11.5° and a focal distance of 400 mm. Alternatively, with reference to FIG. 3, lens 22 may deflect each of the signal beams 14a, b, c at an angle of 12° and a focal distance of 400 mm. One procedure for constructing holographic lens 24 is disclosed in U.S. Pat. No. 4,447,111. The spacing between the beam modulating image means 22 and the multiple beam generating lens 24 is not critical and may be about one focal distance or less, but should be maintained once selected.

A multitude of diffraction patterns, referred to as matched filters, are recorded in matched filter plate 26, and each of these diffraction patterns represents a view of the suspected target or targets. Each output beam of lens 24 is focused on and passes through a respective one of the matched filters recorded in the matched filter plate 26. Optical detection means 30, preferably comprising a plurality of inverse transform lenses 32a, b, c and photosensitive means 34a, b, c, is located in the paths of output beams of matched filter plate 26 to generate a signal when the correlation between the pattern of one of the beams focused on the matched filter plate and the matched filter on which that one of the beams is focused, rises above a predetermined value.

More specifically, if the target view represented by a particular diffraction pattern recorded in filter plate 26 is present in the scene exposed to the signal beams at image means 22, then a portion of the signal beam passing through that particular diffraction pattern is redirected by the matched filter plate into a relatively intense output beam at a selected angle relative to the axis of the incident signal beam. If this happens, an associated inverse transform lens focuses that matched filter plate output beam onto an associated photosensitive means. This photosensitive means may be used, for example, to trigger an alarm, to keep count of the number of correlation detected by system 10, or for other analysis or observation purposes.

Figure 4:
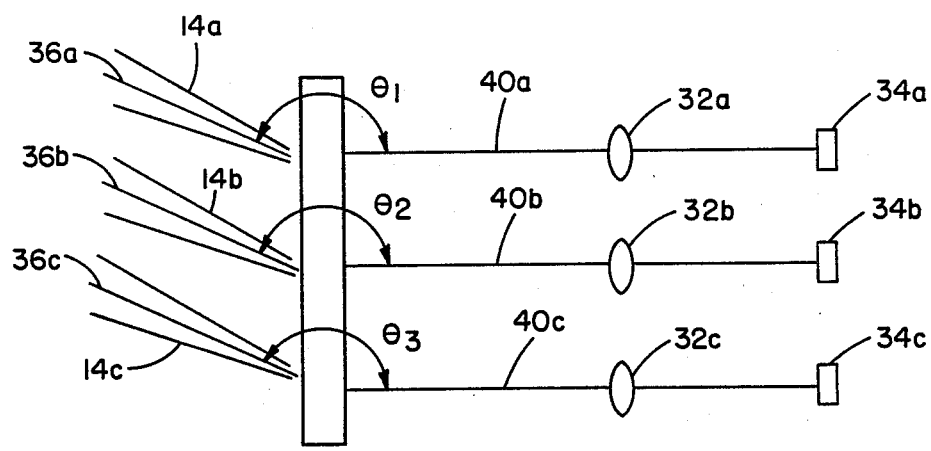
FIG. 4 is an enlarged view of another portion of FIG. 1, and in particular schematically shows the output of the matched filter plate thereof.

Even more specifically, each of the signal beams 14a, b, c is incident on matched filter plate 26 along a respective one input axis, and when the correlation between the pattern of a respective one of the signal beams and the matched filter on which that one signal beam is focused rises above a given value, then the matched filter plate deflects a portion of the one signal beam onto a respective one output axis, preferably at an angle perpendicular to the plane of the matched filter plate. For example, as schematically illustrated in FIG. 4, signal beam 14a is incident on matched filter plate 26 along axis 36a and is focused on a first matched filter thereof; and when the correlation between the pattern of signal beam 14a and that first matched filter rises above a given value, the matched filter plate deflects a portion of signal beam 14a onto output axis 40a at an angle $\theta_1$ to input axis 36a. Inverse transform lens 32a is located on axis 40a, and focuses any output beam of filter plate 26 on this axis onto photosensor 34a.

Similarly, signal beam 14b is incident on matched filter plate 26 along axis 36b and is focused on a second matched filter of the filter plate; and when the correlation between the pattern of signal beam 14b and that second matched filter rises above a given value, the matched filter plate deflects a portion of signal beam 14b onto output axis 40b at an angle $\theta_2$ to input axis 36b. Inverse transform lens 32b is located on axis 40b, and focuses any output beam of filter plate 26 on this axis onto photodetector 34b. Signal beam 14c is incident on matched filter plate 26 along axis 36c and is focused on a third matched filter of the filter plate; and when the correlation between the pattern of signal beam 14c and that third matched filter rises, above a given value, the matched filter plate deflects a portion of signal beam 14c onto output axis 40c at an angle $\theta_3$ to input axis 36c. Inverse transform lens 34c is located on axis 40c and deflects any output beam of filter plate 26 on this axis onto photodetector 34c.

If none of the target views represented by the diffraction patterns of matched filter 26 is present in the scene or scenes exposed to the signal beams by image means 22, then any output beams of the matched filter plate are all relatively weak and diffused. These beams remain weak and diffused as they pass through lenses 32a, b, c, and the beams do not activate detectors 34a, b, c to trigger the associated alarm.

Various arrangements may be used to generate the signal beams and to combine them into multicomponent, multiwavelength beam 20. For example, FIG. 1 illustrates one arrangement wherein a plurality of discrete wavelength sources, such as lasers 42a, b, c, simultaneously direct their output beams to diffraction grating 44. If each wavelength source is positioned at a particular angle and distance from grating 44, then this grating deflects all of the incident input beams onto a single output axis.

Figure 5:
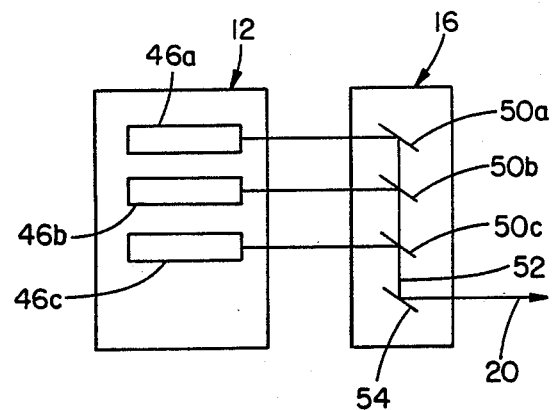
FIG. 5 shows an alternate beam generating means that may be used in the system of FIG. 1.

FIG. 5 illustrates an alternate arrangement, in which various wavelength sources, such as lasers 46a,b,c, are aligned sequentially in a plane, and a plurality of dichroic mirrors 50a, b, c arranged in the same plane, are employed to direct the discrete wavelength outputs of the wavelength sources onto a common axis. It is a characteristic of a dichroic mirror that it transmits all wavelengths of radiation except radiation incident thereon at a selected angle and a selected wavelength, which it reflects. End laser 46a has its output beam 14a directed at a first dichroic mirror 50a; and the output therefrom is directed along axis 52, which passes through a plurality of dichroic mirrors 50b, c, and is then reflected off a plane mirror 54. The second laser 46b has an output beam 14b which is directed at dichroic mirror 50b, and the reflected beam therefrom is also directed along axis 52 to plane mirror 54; and third laser 46c, having an output beam 14c, is directed to dichroic mirror 50c, which reflects the beam onto axis 46 and mirror 54. Mirror 54 reflects all of the signal beams 14a, b, c to image means 22 of system 10.

With another embodiment, a holographic lens (not shown) could be substituted for diffraction grating 44 of FIG. 1. If each wavelength source 42a, b and c is positioned at a particular angle and distance from this holographic lens, then, this lens, basically operating in a reverse mode, deflects all of the incident input beams onto a single output axis. As still another example, the signal beams may be generated by one or more multiple beam producing lasers, each of which generates a plurality of light beams at a plurality of wavelengths.

Preferably, the lasers employed in the practice of the present invention are of the gaseous type such as argon or Krypton ion lasers producing continuous outputs at the desired wavelengths, but suitable lasers of other types such as a semiconductor type, a yttrium aluminum garnet (YAG) or helium-neon continuous wave lasers, a carbon dioxide laser or a pulsed laser can also be employed in system 10.

Figure 6:
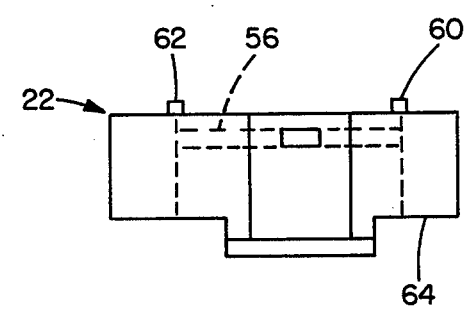
FIG. 6 and 7 show two beam modulating image means that may be employed in the correlator system of FIG. 1.

Various types of beam modulating image means may be used in system 10; and, for example, as represented in FIGS. 1 and 6, the image means may comprise a film 56 connected to a pair of spaced spools or rollers 60 and 62. Initially, the film is wound around a first spool 60, and in use, any suitable drive means (not shown) is connected to second spool 62 to rotate that spool and advance or reverse the film transversely in a plurality of discrete steps across the path of the signal beams. The film and rollers may be housed in a liquid gate 64 having a pair of aligned windows (one of which is shown at 66 in FIG. 6) positioned to allow the signal beam to pass through the housing and to expose the film therein to that signal beam.

Figure 7:
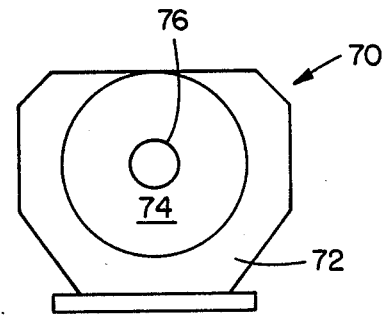

Alternatively, with reference to FIG. 7, the imaging means 22 may comprise a rotating liquid gate 70 including stationary frame 72 and rotatable plate 74 internal to the frame. Plate 74 includes a central opening or window 76 for holding a picture of a selected view or object, and the plate is supported by frame 72 for rotation about the axis of that central opening. A computer controlled stepper motor (not shown) is supported by frame 72 and connected to plate 74 by any suitable drive mechanism (also not shown) to rotate the plate, and thus the picture held in opening 76, about the axis of that opening, through a plurality of discrete annular steps. Rotatable linear gates are also known in the art and may be used in the practice of this invention.

Figure 8:
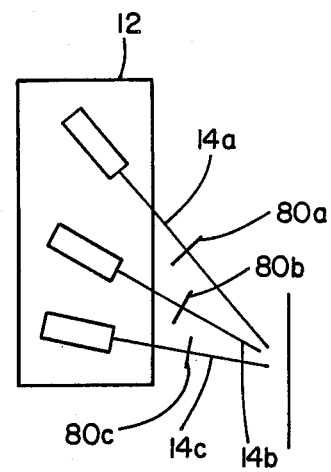
FIG. 8 shows an alternate placement for the beam modulating image means of the correlator system.

As illustrated in FIG. 1, beam modulating image means 22 is located in the path of the multicomponent, multiwavelength beam 20, between beam combining means 16 and multiple holographic lens 24. Alternatively, as shown in FIG. 8, a plurality of beam modulating image means 80a, b, c may be positioned between beam generating means 12 and beam combining means 16, with each of these plurality of imaging means located in the path of and spatially modulating, a respective one of the signal beams 14a, b, c. With the former arrangement, the image means 22 may include a plurality of views, each one being recorded on the image means at a respective one of the wavelengths of the signal beam. With the latter arrangement, each image means 80a, b, c may have a respective one view, recorded on the image means at the wavelength of the signal beam to which the view is exposed.

Filtering and collimating means (not shown) is preferably located between beam generating means 12 and beam combining means 16 to filter and collimate the signal beams 14a, b, c and to adjust the diameters of those beams to preferred sizes. The desired filtering and collimating could be done between beam combining means 16 and image means 22; however, the former arrangement is preferred since it is simpler. Also, as will be understood by those of ordinary skill in the art, instead of using an array of photosensitive cells 34a, b, c, optical detection means 30 may comprise a single photosensitive cell positioned so that all of the appropriate output beams of inverse transform lenses 32a, b, c are incident on the photosensitive cell. Similarly, any suitable multiple beam generating holographic lens, matched filters plates and inverse transform lens may be used in system 10. Numerous such devices are known in the art, and it is unnecessary to describe these devices in detail herein. For instance, U.S. Pat. No. 4,703,994 describes one procedure to make a matched filter plate having an array of matched filters; and, as previously mentioned, U.S. Pat. No. 4,447,111 discloses a process for making a multiple beam generating holographic lens that may be used in the practice of this invention.

Figure 9:
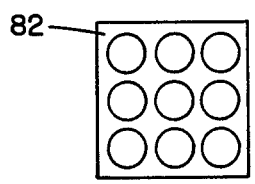
FIG. 9 shows a matched filter plate having a multitude of matched filters arranged in a regular pattern.

Typically, correlator systems use matched filters plates having matched filters arranged in a regular geometric array, and FIG. 9 illustrates how nine matched filters may be packed on a recording medium 82. As can be seen, there is an appreciable amount of unused space between the matched filters, reducing the number of matched filters that can be recorded on the filter plate.

Figure 10:
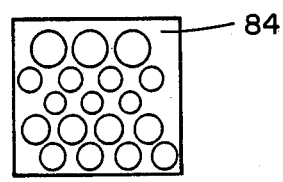
FIG. 10 shows a matched filter plate having a multitude of matched filters arranged in an irregular pattern.

With the present invention, by choosing the wavelengths of the signal beams and properly constructing lens 24, each of the angles over which the signal beams are deflected can be independently selected, providing a greater amount of control over exactly where the signal beams are focused on the matched filter plate, and those beams can be focused on the matched filter plate in an irregular pattern. This, in turn, allows the correlator system to use a matched filter plate having the matched filters arranged in an irregular pattern, and this allows those matched filters to be more closely packed together, for example as in filter plate 84 shown in FIG. 10. This invention, then, enables a significant improvement in memory capacity to be achieved. Moreover, because the signal beams are combined into a single multicomponent beam 20, those beams can be subsequently deflected at different angles by a single multiple holographic lens 24 and it is not necessary to use multiple lenses to deflect the signal beams as desired; and as a result, system 10 may have a very simple compact design.

The total number of matched filters that can be formed in a matched filter plate can be expressed by the equation:

$$C = k \frac{g p s}{(N\nu\lambda F)^2} \frac{\text{matched filters}}{\text{cm}^2}$$

where:

C is the matched filter capacity of the matched filter plate,

λ, F are the operating wavelength and the focal length of the multiple holgraphic lens 24.

Nν is the bandpass of the matched filters in cycles/mm.

g is a geometrical factor, referred to as a packing factor, that varies depending on the geometrical arrangement of the matched filters on the match filter plate. Packing factors of 1 or 1.15 are representive numbers.

p is a factor representing the number of matched filters overlapped or represented by each matched filter position on the matched filter plate. Values of 1 to 8 are representative numbers for p.

s is a factor referred to as the split spectrum factor, and s can be 1 or 2. Since the Fourier Transforms of the signal beam used to make a matched filter is symmetrical about a plane, only half of the Fourier Transform of that beam is actually needed to make the matched filter. If only half of the Fourier Transform of the signal beam is used, then the total number of matched filters that can be made on a given matched filter plate is doubled, and the s factor in the above equation is 2. As a practical matter, however, it is difficult to make a matched filter using only half of the Fourier Transform of the signal beam. Thus, generally the whole of that Fourier Transform is used to make the matched filter, in which case the s factor in the above equation is 1.

k is a constant used to insure that the right hand side of the above equation is expressed in terms of matched filters per square centimeters.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A polychromatic optical correlator system, comprising:
    means to generate simultaneously a plurality of electromagnetic signal beams at a plurality of wavelengths;
    beam combining means to direct the signal beams along an axis to form a multicomponent, multiwavelength beam comprising said signal beams;
    beam modulating image means to expose at least one view to the signal beams to spatially modulate each of the signal beams;
    an optical memory element having a plurality of matched filters stored therein;
    a multiple beam generating holographic lens located in the path of the multicomponent, multiwavelength beam to deflect each of the component signal beams thereof onto the optical memory element, with each of the signal beams being focused on a respective one of the matched filters of the optical memory element; and
    optical detection means located in the paths of output beams of the optical memory element to produce a signal when the correlation between the pattern of one of the signal beams focused on the optical memory element and the matched filter on which said one of the beams is focused, rises above a predetermined value.

2. A correlator system according to claim 1, wherein the multiple beam generating holographic lens deflects each of the component signal beams of the multicomponent, multiwavelength beam at one fixed angle relative to the axis of the multicomponent, multiwavelength beam.

3. A correlator system according to claim 1, wherein the multiple beam generating lens deflects the component signal beams of the multicomponent, multiwavelength beam at a plurality of angles relative to the axis of the multicomponent, multiwavelength beam.

4. A correlator system according to claim 1, wherein when the correlation between the pattern of each one of the signal beams and the one matched filter on which said one signal beam is focused rises above a given value, said one matched filter deflectes said one signal beam onto a respective one output axis.

5. A correlator system according to claim 4, wherein:
    the optical detection means includes a plurality of inverse transform lenses, and photosensitive means; and
    each inverse transform lens is located on a respective one of the output axes to deflect an output beam from the optical memory element onto the photosensitive means.

6. A correlator system according to claim 1, wherein:
    the image means is located in the path of the multicomponent, multiwavelength beam, between the beam combining means and the multiple beam generating holographic lens; and
    the image means includes a plurality of views, each of the views being recorded on the image means at a respective one of the wavelengths.

7. A correlator system according to claim 1, wherein:
    the means to generate the signal beams includes a plurality of beam sources, each beam source generating a respective one of the signal beams at a respective one of the wavelengths;
    the image means includes a plurality of gate means; and
    each gate means is located in the path of a respective one of the signal beams, between the beam combining means and the beam source generating the signal beam.

8. A correlator system according to claim 7, wherein:
    each gate means exposes a respective one view to the respective one signal beam; and
    each view is recorded on the gate means at the wavelength of the signal beam to which the view is exposed.

9. A polychromatic optical correlator system, comprising:
    a first beam generator to generate a first signal beam at a first wavelength;
    a second beam generator to generate a second signal beam at a second wavelength;
    a third beam generator to generate a third signal beam at a third wavelength;
    beam recombining means to direct the signal beams along an axis to form a multicomponent, multiwavelength beam comprising said signal beams;

beam modulating image means to expose at least one view to the signal beams to spatially modulate the signal beams;

an optical memory element having at least first, second and third matched filters stored therein;

a multiple beam generating holographic lens located in the path of the multicomponent, multiwavelength beam to deflect each of the component signal beams thereof onto the optical memory element, with the first signal beam being focused on the first matched filter, the second signal beam being focused on the second matched filter, and the third signal beam being focused on the third matched filter; and optical detection means located in the paths of output beams of the optical memory element to produce a signal when the correlation between the pattern of one of the signal beams focused on the optical memory element and the matched filter on which said one of the beams is focused, rises above a predetermined value.

10. A correlator system according to claim 9, wherein the multiple beam generating holographic lens deflects each of the first, second and third signal beams at the same angle relative to the axis of the microcomponent, multiwavelength beam.

11. A correlator system according to claim 9, wherein the multiple beam generating lens deflects the first signal beam at a first angle relative to the axis of the multicomponent, multiwavelength beam, deflects the sound signal beam at a second angle relative to the axis of the multicomponent, multiwavelength beam, and deflects the third signal beam at a third angle relative to the axis of the multicomponent, multiwavelength beam.

12. A correlator system according to claim 9, wherein:

the first, second and third signal beams are incident on the optical memory element along first, second and third input axes respectively;

when the correlation between the pattern of the first signal beam and the first matched filter rises above a given value, the first matched filter deflects a portion of the first signal beam onto a first output axis;

when the correlation between the pattern of the second signal beam and the second matched filter rises above a given value, the second matched filter deflects a portion of the second signal beam onto a second output axis at a second angle relative to the second input axis; and when the correlation between the pattern of the third signal beam and the third matched filter rises above a given value, the third matched filter deflects a portion of the third signal beam onto a third output axis.

13. A correlator system according to claim 12, wherein:

the optical detection means includes first, second and third inverse transform lenses, and photosensitive means;

the first inverse transform lens is located on the first output axis to focus said portion of the first signal beam onto the photosensitive means;

the second inverse transform lens is located on the second output axis to focus said portion of the second signal beam onto the photosensitive means; and the third inverse transform lens is located on the third output axis to focus said portion of the third signal beam onto the photosensitive means.

14. A correlator system according to claim 9, wherein:

the image means is located in the path of the multicomponent, multiwavelength beam, between the beam combining means and the multiple beam generating holographic lens; and the image means includes (i) a first view recorded on the image means at the first wavelength to spatially modulate the first signal beam, (ii) a second view recorded on the image means at the second wavelength to spatially modulate the second signal beam, and (iii) a third view recorded on the image means at the third wavelength to spatially modulate the third signal beam.

15. A correlator system according to claim 9, wherein the image means includes:

first means located in the path of the first signal beam, between the first beam generator and the beam combining means, and having a first view recorded at the first wavelength to spatially modulate the first signal beam;

second means located in the path of the second signal beam, between the second beam generator and the beam combining means, and having a second view recorded at the second wavelength to spatially modulate the second signal beam; and third means located in the path of the third signal beam, between the third beam generator and the beam combining means, and having a third view recorded at the third wavelength to spatially modulate the third signal beam.

16. A polychromatic optical correlator system, comprising:

N beam generators to generate N signal beams at N wavelengths, where N is a whole number greater than one;

means to direct the signal beams simultaneously along an axis to form a multicomponent, multiwavelength beam comprising said signal beams;

beam modulating image means to expose a multitude of views to the signal beams to spatially modulate the signal beams;

an optical memory element having N matched filters stored therein;

a multiple beam generating holographic lens located in the path of the multicomponent, multiwavelength beam to focus each of the component signal beams thereof onto a respective one of the matched filters of the optical memory element; and optical selection means located in the paths of output beams of the optical memory element to generate a signal when the correlation between the pattern of one of the signal beams focused on the matched filter plate and the matched filter on which said one of the beams is focused, rises above a predetermined value.

17. A correlator system according to claim 16, wherein:

said N signal beams includes first, second and third signal beams;

said N matched filters includes first, second and third matched filters;

the multiple beam generating holographic lens focuses the first, second and third signal beams onto the first, second and third matched filters, respectively;

the first, second and third signal beams are incident on the optical memory element along first, second and third input axes respectively;

when the correlation between the pattern of the first signal beam and the matched filter rises above a given value, the first matched filter deflects a portion of the first signal beam onto a first output axis;

when the correlation between the pattern of the second signal beam and the second matched filter rises above a given value, the second matched filter deflects a portion of the second signal beam onto a second output axis;

when the correlation between the pattern of the third signal beam and the third matched filter rises above a given value, the third matched filter deflects a portion of the third signal beam onto a third output axis;

the optical detection means includes first, second and third inverse transform lenses, and photosensitive means;

the first inverse transform lens is located on the first output axis to focus said portion of the first signal beam onto the photosensitive means;

the second inverse transform lens is located on the second output axis to focus said portion of the second signal beam onto the photosensitive means; and the third inverse transform lens is located on the third output axis to focus said portion of the third signal beam onto the photosensitive means.

* * * * *

UNITED STATES PATENT AND TRADEMARK OFFICE
CERTIFICATE OF CORRECTION

PATENT NO. : 4,941,733
DATED : July 17, 1990
INVENTOR(S) : Kenneth G. Leib

It is certified that error appears in the above-identified patent and that said Letters Patent is hereby corrected as shown below:

Column 9, Line 26, Claim 10, "microcomponent" should read as, --multicomponent--.

Column 10, Line 56, Claim 16, "Selection" should read as --detection--.

Signed and Sealed this

Twenty-fourth Day of December, 1991

Attest:

HARRY F. MANBECK, JR.

*Attesting Officer*         *Commissioner of Patents and Trademarks*